Jan. 12, 1960   U. BAUDER ET AL   2,920,794
VOLUMETRIC DISPENSING DEVICE
Filed Sept. 20, 1957   4 Sheets-Sheet 1

INVENTORS:
ULRICH BAUDER
OTTO BARTHELMESS

By
Richardson, David and Verdon
ATTYS.

Jan. 12, 1960    U. BAUDER ET AL    2,920,794
VOLUMETRIC DISPENSING DEVICE
Filed Sept. 20, 1957    4 Sheets-Sheet 3
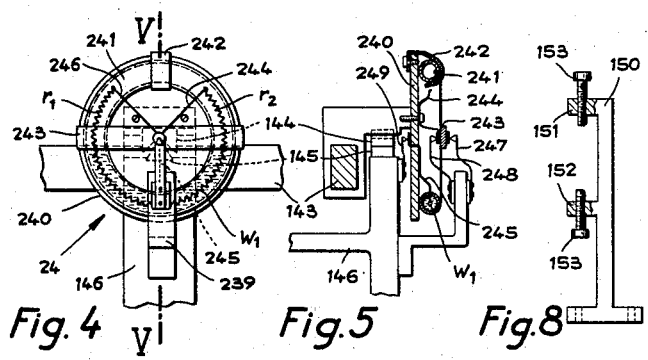
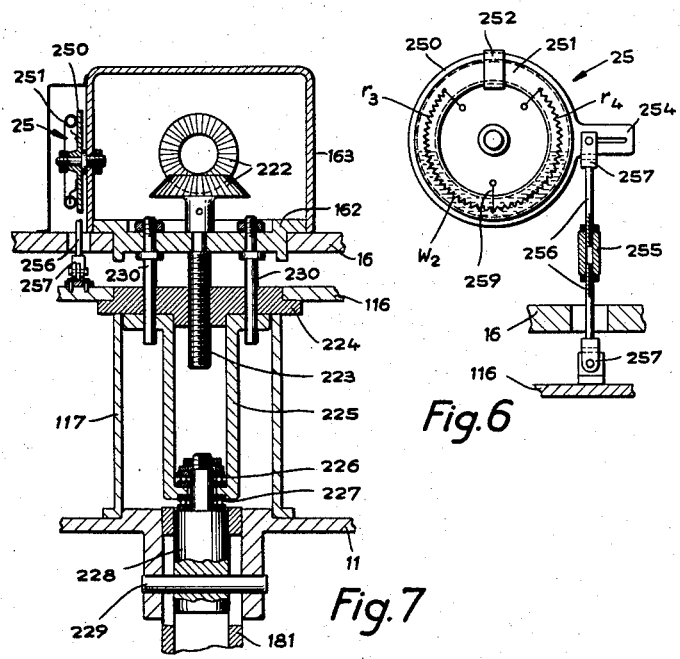
INVENTORS:
ULRICH BAUDER
OTTO BARTHELMESS
by
Richardson, Davis and Nordon
ATTY'S.

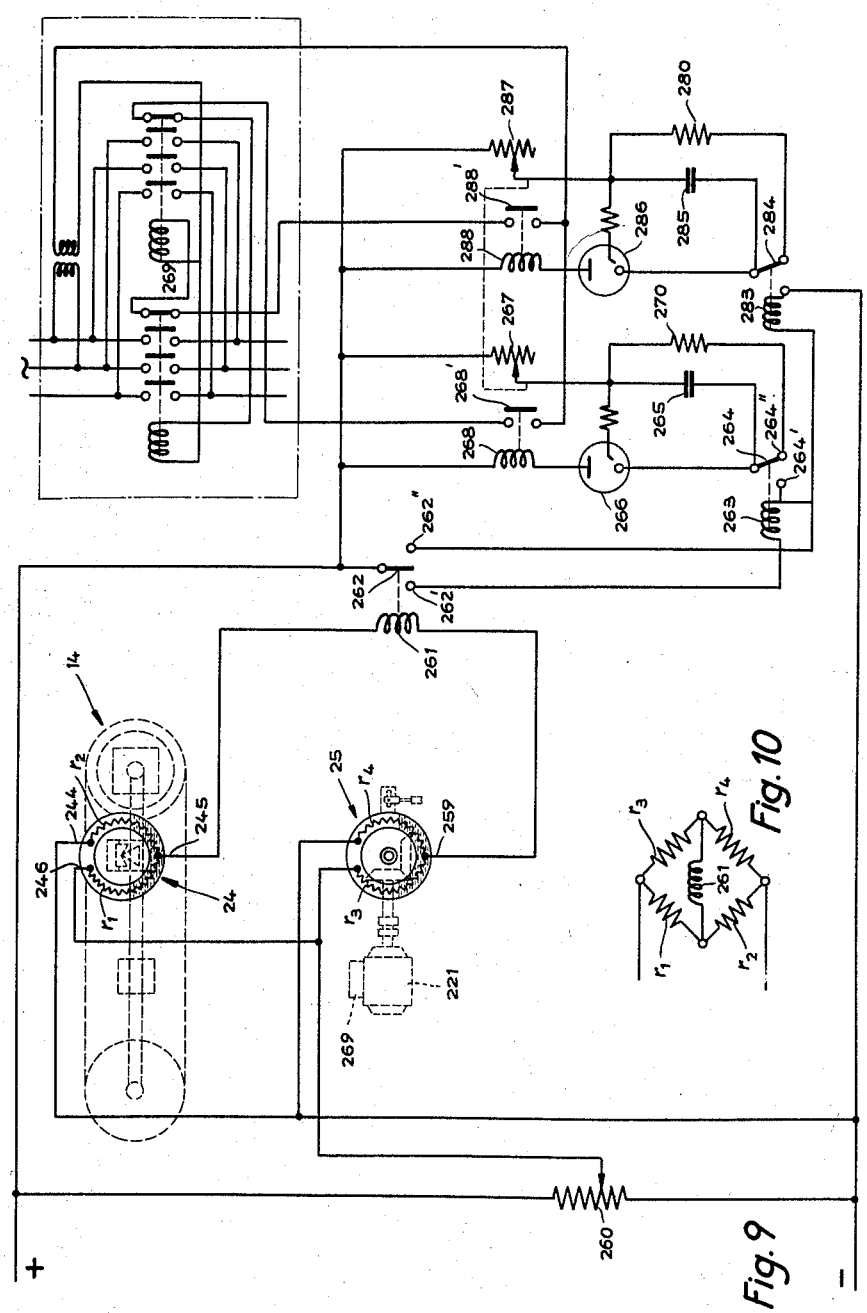

United States Patent Office 2,920,794
Patented Jan. 12, 1960

2,920,794
VOLUMETRIC DISPENSING DEVICE

Ulrich Bauder, Stuttgart, and Otto Barthelmess, Stuttgart-Bad Cannstatt, Germany, assignors to Firma Fr. Hesser Maschinenfabrik-Aktiengesellschaft, Stuttgart-Bad Cannstatt, Germany, a corporation of Germany Application September 20, 1957, Serial No. 685,102

Claims priority, application Germany September 21, 1956

4 Claims. (Cl. 222—63)

It is already known to provide dispensing, metering and filling machines with one or a plurality of balances checking at predetermined intervals the already measured bulk material quantities for their correct weight. The results obtained thereby may either be used as a base for corresponding manual adjustments of the metering means of the machine or to control an automatically operating adjusting device for such means. Such controlling is unsatisfactory as it is carried out only after a more or less prolonged time interval after the metering of the corresponding quantities of the bulk material which results in a correspondingly long time of delay for the readjustment which might become necessary. Thus it may happen that a larger number of metered quantities having incorrect weight will leave the machine, in particular when the specific gravity of the bulk material frequently varies.

In order to obviate this drawback it has been proposed to carry off the samples of bulk material to be checked for their weight immediately in front of the metering means of such machines from their supply channel and to deliver them to a separate measuring device discharging the quantities it has measured into a check balance which latter again controls the adjusting device of the machines in accordance with the weight obtained in any case.

The lateral withdrawal of the check quantities caused by the design of such machines and by the manner in which the bulk material is carried, however, in most cases does not result in exactly equal conditions in particular concerning the filling pressure and the filling degree in the metering means and in the checking means of the machines so that again irregularities in the filling weights may occur.

Furthermore in any case each checking operation constitutes only a random weighing operation which for a relatively quickly varying density of the bulk material, of course, cannot include all values. This is a particularly true with machines having high filling capacity.

These drawbacks are eliminated according to the invention in such a manner that the machines of the type mentioned are preceded by a suitable continuously operating balance such as a conveyor belt balance or the like, and by arranging that all of the bulk material is first passed through this balance which controls the adjusting device for the metering means of the machines in accordance with the weight values which are continuously detected by the balance. Thus all the bulk material entering the machines is subjected to the checking operation so that any change in the density of the bulk material is immediately detected and utilized.

The requirement that the checking operation and the readjustment of the metering means are to be carried out on one and the same portion of the bulk material carried through the machines is obtained by placing a preferably adjustable time-delay relay of any suitable known type between the balance and the adjusting device for the metering means. Since the weighing operations are not carried out by units of time and only the weight of the material actually being at any time in the balance is utilized, the rate of conveying is not critical and should only be dependent upon the metering capacity of the machine.

In the drawings illustrating a preferred embodiment of the invention:

Fig. 4 is an annular tube type transmitter secured to the conveyor belt balance;

Fig. 5 is a sectional view along the line V—V of Fig. 4;

Fig. 6 is a front elevation of a second annular tube type transmitter provided at the measuring chamber adjusting device of the machine;

Fig. 7 is a cross-sectional view of the measuring chamber adjusting device shown in Fig. 6;

Fig. 8 is a stroke limitation for the conveyor belt balance of the machine;

Fig. 9 is a circuit diagram of the control means of the adjusting device of the machine;

Fig. 10 is a diagrammatic view of the wiring diagram of the control resistances of the annular tube type transmitters and of the control relay.

Figure 1:
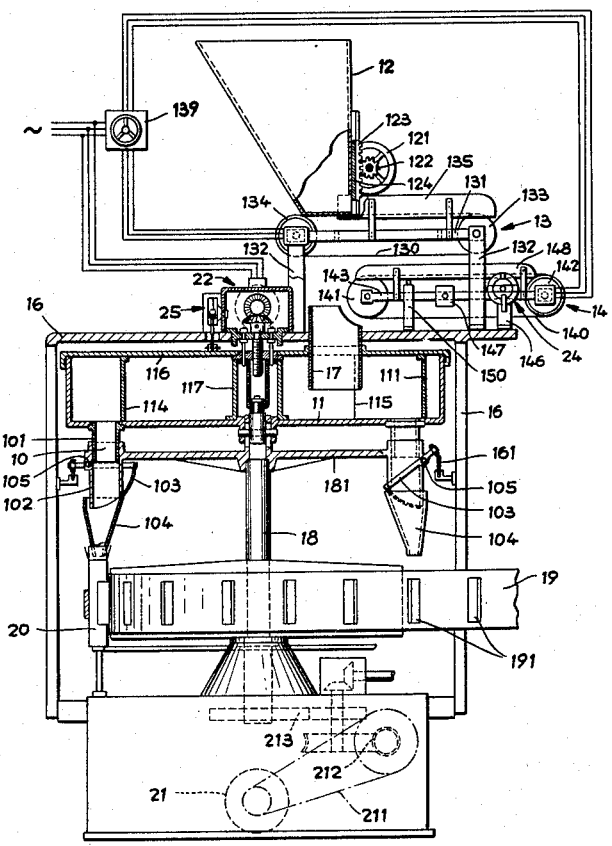
Fig. 1 is a side elevation of a filling machine according to the invention partly in cross section.
Figure 2:
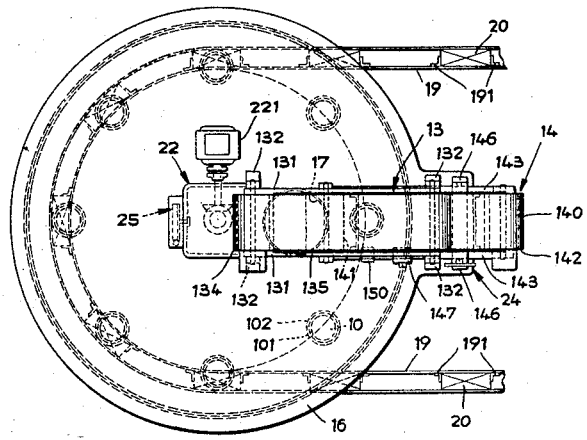
Fig. 2 is a plan view of the filling machine shown in Fig. 1.
Figure 3:
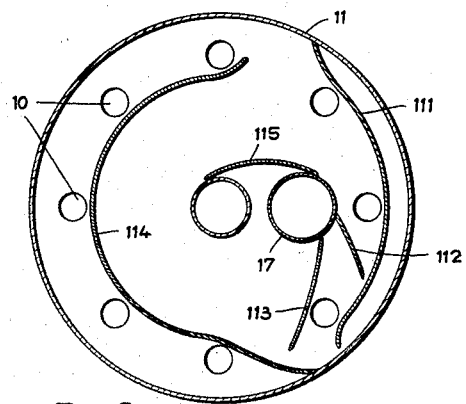
Fig. 3 is a sectional view of the distributor plate of the machine.

The embodiment illustrated shows a plate type dispensing machine of known type having a plurality of revolving measuring chambers (measuring means) 10 which are centrally adjustable and are filled by means of a common distributor plate 11.

On top of the dispensing machine a supply device for the bulk material is provided comprising a hopper 12, a supply conveyor 13 and a conveyor belt balance 14. A sliding gate 124 is arranged at the discharge end of the hopper 12 which sliding gate is adjustable by means of a hand wheel 121 through the medium of a gear wheel 122 and a rack 123 to vary its height of passage which permits the height of the layer of material supplied to be controlled.

The supply conveyor 13 conveying per unit of belt length an equal volume of bulk material to the conveyor belt balance 14 is passed over a pulley 133 and an external rotor motor 134 driving the belt 130. Such external rotor motors are known in the art so that they are not described and illustrated herein. The pulley 133 and the external rotor motor 134 are mounted in a frame 131 secured to the filling machine by means of supporting members 132.

The bulk material is discharged in the height of the axis of rotation of the conveyor belt balance 14 onto the balance conveyor 140 likewise passed over a pulley 141 and an external rotor motor 142 driving a pulley 141. The speed of the external rotor motor 142 may be controlled together with that of the external rotor motor 134 of the supply conveyor 13 by means of a resistance 139 or the like in accordance with the filling capacity of the machine. The pulley 141 and the external rotor motor 142 are secured to a balance beam 143 designed as a frame which is mounted by means of sockets 144 on knife edges 145 mounted on a bracket 146. Adjustment of the conveyor belt balance 14 may be effected by means of a sliding weight 147 slidable on the balance beam 143. An arm 150 secured to the housing 16 of the dosing machine (Fig. 8) is projecting with lugs 151, 152 into the oscillating plane of the balance beam 143 thereby limiting by means of set screws 153 the deflection of the conveyor belt balance 14. The supply conveyor 130 and the balance conveyor 140 are laterally limited in their conveying planes by checks 135 and 148.

The conveyor balance 14 discharges the bulk material through a filling tube 17 into a distributor plate 11 in which it is passed in known manner by means of baffles and strippers 111, 112, 113, 114, 115 to the different revolving measuring chambers 10. The measuring chambers 10 are formed by telescopically interengaging measuring cylinders 101, 102 closed below by cam controlled pivotally mounted slide members 103 whilst being filled. The upper measuring cylinders 101 are secured to the distributor plate 11. The lower measuring cylinders 102 are carried by a disc 181 secured to the machine shaft 18. The oscillating slide members 103 are rotatably mounted on the disc 181 by means of pins 105 and are controlled by means of a cam member 161 fixed to the housing 16 of the dosing machine.

The vertical machine shaft 18 may be driven from a motor 21 by means of a belt 211, a worm gear 212 and a gear mechanism 213. This causes a rotary motion of the drum 182 driving the conveyor chain 19, as well as of the disc 181 and of the distributor plate 11 axially slidable on the disc 181, whereby the different containers 20 or the like are filled which are conveyed between driving members 191 provided on the conveyor chain 19.

In order to obtain always correct filling weights the volume of the measuring chambers 10 is automatically varied in accordance with the actual density of the filling material by means of an adjusting device 22 referred to in detail hereinafter and capable of axially raising or lowering the measuring cylinders 101 together with the distributor plate 11.

The adjusting device 22 is controlled by the conveyor belt balance 14 of which the deviation from the position of equilibrium is detected by means of an annular tube type transmitter 24 secured to the balance beam 143 and transmitted to the adjusting device 22 by an electric circuit to be described hereinafter.

As shown in Fig. 7 the adjusting device comprises a spindle 223 in coaxial relationship with the machine shaft 18, said spindle being driven by means of a bevel gearing 222 from an adjusting motor 221 of known type. The spindle 223 is rotatably mounted within the machine housing 16 by means of a flange 162 and is in engagement with a flange type spindle nut 224 secured to the distributor cover 116. In order to prevent rotation of the distributor cover 116 and consequently of the spindle nut 224 two guiding bolts 230 are secured in the flange 162 which bolts are slidable in bores of the spindle nut 224. Since upon adjusting the height not only the distributor cover 116 but also the distributor plate 11 and the upper measuring cylinders 101 have to be axially displaced, the spindle nut 224 has secured thereto a bell-shaped bracket 225 in the head of which by means of a thrust bearing 226, 227 a stub shaft 228 is mounted for rotation but not longitudinally displaceable. The stub shaft 228 which in addition is guided in the disc 181 is firmly connected with the distributor plate 11 by means of a driving pin 229 so that the distributor plate will follow the adjusting motion of the spindle nut 224. Between the spindle nut 224 and the bottom of the distributor plate 11 a spacer 117 is inserted preventing the filling material from entering the bearing 226, 227.

The adjusting device 22 is in addition fitted with a further annular tube type transmitter 25 the purpose of which will be described later. This transmitter is rotatably mounted on the housing 163 surrounding the bevel gearing 222 and connected to a distributor cover 116 through a linkage 256 adjustable in its length by means of a turnbuckle 255 which linkage is provided with a fork 257 engaging at one lever arm of the annular tube type transmitter 25 in such a manner that an axial displacement of the distributor cover 116 and consequently of the distributor plate 11 causes a rotational movement of the annular tube type transmitter 25.

Each of the two annular tube type transmitters 24, 25 comprises a closed tube 241, 251 secured to a disc 240, 250 by means of clips 242, 252. The tube 241, 251 which may consist of glass contains a resistance $w_1$, $w_2$ provided with a center tap 245, 259. The tube 241, 251 is approximately to one half filled with mercury surrounding the lower portion of the resistance $w_1$, $w_2$ thereby leaving free at both sides two partial resistances $r_1$, $r_2$ and $r_3$, $r_4$ having equal lengths in the position of equilibrium of the balance. The annular tube type transmitter 25 may be connected to the adjusting device 22 by means of cables whilst the annular tube type transmitter 24 secured to the balance beam 143 requires special contacts which are provided on the extension of the knife edge line of the balance beam 143. Two of these contacts which are interconnected with the connections 244, 246 are provided on an insulating bridge 243 whilst the third contact connected with the center tap 245 is provided on the disc 240. The current supply to all of the contacts is over resilient counter contacts 247, 248, 249 secured to an angular member 239 and directly to the bracket 146 of the balance beam 143 respectively.

The mode of operation of the control means for the adjusting device 22 is as follows:

The partial resistances of the two annular tube type transmitters 24 and 25 form a bridge circuit (Fig. 10) including a control relay 261. In the undeflected position of the balance beam 143 and of the adjusting device 22 the partial resistances $r_1$, $r_2$, $r_3$, $r_4$ have equal values so that no current is flowing through the control relay 261 and the switch 262 is in the zero position shown in Fig. 9. If now a specifically heavier filling material is running through the conveyor belt balance 14 this latter is lowered by a certain amount so that the two partial resistances $r_1$ and $r_2$ will have different values. This causes a current to flow through the control relay 261 whereby the switch 262 is switched over to the contact 262'. In this switch position the contactor 269 may be directly actuated and the reversible adjusting motor 221 connected to the latter kept cut in as long as the value of the partial resistances $r_3$ and $r_4$ of the annular tube type transmitter 25 on the adjusting device 22 have the same ratio as those of the annular tube type transmitter 24 on the conveyor belt balance 14. In this way the balance of the bridge is reestablished, the control relay 261 deenergized the switch 262 of which returns to its zero position and the adjusting motor 221 is cut out. If the specific weight of the supplied filling material again varies, the balance beam 143 takes another position so that the sequence of operations as described hereinbefore is reinitiated.

Since a more or less large quantity of bulk material is between the balance conveyor 240 and the measuring chambers 10, the control pulses should be delayed, if the measuring chamber readjustment is to be correct, always until the filling material portion measured by the conveyor belt balance 14 is in fact filled into the measuring chambers 10. This may be realized by means of the adjustable time-delay relay connected between the control relay 261 and the contactor 269. The mode of operation of the time-delay relay is as follows: If the switch 262 is moved to the contact 262' the relay 263 will be energized and its contact 264 will be moved to the contact 264'. This causes a capacitor 265 to be charged through a variable resistance 267 until at a certain charging condition a relay tube 266, such as an unheated cathode-ray tube or a thyratron, connected to this circuit is fired, so that an anode current is flowing through the relay tube 266 which current energizes a further relay 268 the switch 268' of which causes the contactor 269 of commercially available type to operate whereby the adjusting motor 221 is cut in. If the switch 262 is moved into the zero position with the bridge in its balanced condition, the switch 264 is moved to the contact 264", the contact 268' opens and the contactor 269 and the adjusting motor 221 are again cut out. The closing of the contact 264" causes also short-circuiting of the capacitor 265 through a serious resistance 270 so that this capacitor is discharged and the initial condition reestablished.

The time of delay may be adjusted to any required magnitude by a corresponding adjustment of the variable resistance 267.

If the balance beam 148 is deflected towards above owing to a lower specific weight of the filling material, the switch 262' of the control relay 261 is moved to the contact 262" which closes a second circuit similar to that described hereinbefore. This second circuit comprises a relay 283, a relay tube 286, a capacitor 285, a variable resistance 287 and a series resistance 280. The anode current of this second energizes the relay 288 associated thereto and closes the contact 288' which in turn causes the operation of the contactor 269 keeping the adjusting motor 221 energized, however, in the reverse direction of rotation until the adjustment of the volume of the measuring chambers 10 is effected in such a manner that the bridge is again balanced which causes the switch 262 of the control relay 261 to return to its zero position.

The two variable resistances 267, 287 are preferably mechanically coupled as their adjustments must be the same.

Balancing of the bridge circuit, i.e. the correct adjustment of voltage and polarity, is effected by means of a potentiometer 260.

Controlling of the adjusting device depending upon the magnitude of the deflection of the balance beam is not only possible by means of the annular tube type transmitters 24, 25 described by way of example hereinbefore, but also by using other suitable means, such as photoelectric cells, or electronic scanners, i.e. capacitively or inductively operating scanners of known type. Also in this case it is preferred to use such devices in pairs, i.e. one of them at the balance and the other at the adjusting device, both being interconnected in a similar manner as with the embodiment illustrated and described by means of a bridge circuit including the control relay.

Instead of using a conveyor belt balance as shown in the embodiment illustrated, of course also similar balances of this type or any other balance suitable for continuously weighing bulk material, such as balances operating by means of screw conveyors or the like, may be employed for check weighing and controlling the adjustable measuring means. The construction according to the invention is by no means limited to plate type dispensing machines but may also be used in the same or in a similar manner with screw type dispensing machines or other volumetrically operating metering machines.

What is claimed is:

1. In combination, a volumetric dispensing device having a measuring chamber, means to vary the volume of said chamber to keep the weight of each dispensed volume constant, a continuously operating conveying means delivering bulk material to said chamber, means to maintain the volume of material in said conveying means constant, and means responsive to the weight of said conveying means filled with said constant volume of material for controlling said means to vary the volume of said chamber.

2. The device of claim 1, wherein the means responsive to the weight of the conveying means includes a tilting balance beam, electric signal generating means responsive to the inclination of said beam, an electric resistance bridge circuit connected to said generating means and including a control relay and a resistance which varies with said inclination, said controlling means including an electrically operable element, and a circuit connecting said relay and element to transmit the correcting pulse produced thereby.

3. A volumetrically operating machine as defined in claim 2, characterized in that the balance beam of the balance and of the means to vary the volume of the chamber each have an annular tube type transmitter of known type associated thereto, the partial resistances of which are variable in accordance with their amount of angular displacement and connected to an electric bridge circuit comprising the control relay for the varying means.

4. A volumetric dispensing device as defined in claim 3, there being an adjustable time delay relay connected between the control relay and the adjusting means.

References Cited in the file of this patent

UNITED STATES PATENTS

| 2,273,330 | Robinson | Feb. 17, 1942 |
| 2,753,099 | Jenner et al. | July 3, 1956 |